United States Patent [19]

Stephens

[11] 4,257,644

[45] Mar. 24, 1981

[54] WHEELCHAIR TIE-DOWN

[76] Inventor: Richard E. Stephens, 10946 Nicosia La., Lakeside, Calif. 92040

[21] Appl. No.: 25,883

[22] Filed: Apr. 2, 1979

[51] Int. Cl.³ .......................... B60N 1/02; B62B 11/00

[52] U.S. Cl. .................................... 296/65 R; 410/12; 410/96

[58] Field of Search ..................... 296/65 R, 65 A, 64, 296/37.14, 37.6; 410/7-12, 19-23, 51, 66, 67, 90, 96, 106, 107, 108, 109, 110, 111, 115, 116; 24/68 CD, 73 CE, 201 HE, 265 CD, 225, 265 H

[56] References Cited

U.S. PATENT DOCUMENTS

| | | | |
|---|---|---|---|
| 817,686 | 4/1906 | Ames | 24/225 |
| 1,010,763 | 12/1911 | Hogan | 24/265 H |
| 1,835,840 | 12/1931 | Barclay | 296/65 R |
| 1,934,165 | 11/1933 | Butterworth | 410/21 |
| 2,024,444 | 12/1935 | Friedlaender | 410/10 |
| 2,442,266 | 5/1948 | Davis | 410/96 |
| 3,469,770 | 9/1969 | Zeller | 24/225 |
| 3,595,125 | 7/1971 | Jacobs | 410/106 |
| 3,955,847 | 5/1976 | Schiowitz | 296/65 R |
| 4,019,752 | 4/1977 | Leon et al. | 296/65 R |
| 4,060,271 | 11/1977 | Williams | 296/65 R |
| 4,083,594 | 4/1978 | Tullock | 296/65 R |
| 4,093,303 | 6/1978 | Nelson | 296/65 R |

*Primary Examiner*—David M. Mitchell
*Attorney, Agent, or Firm*—Henri J. A. Charmasson

[57] ABSTRACT

A wheelchair tie-down apparatus is provided for use on buses, vans, and other vehicles with emphasis in the public transportation area. The tie-down apparatus comprises three elongated coffers arranged to define a wheelchair bay, each of these coffers having hinged lids which open to expose an extendable, length-adjustable, flexible strap which is connected to a structural member of the wheelchair and then all three straps are cinched down through use of the length adjustment mechanism.

3 Claims, 8 Drawing Figures

WHEELCHAIR TIE-DOWN

BACKGROUND OF THE INVENTION

An increasing focus of attention on the unique problems of the handicapped has resulted in the provisions of special up-close parking spaces, specially designed public rest areas, and buses which not only utilize specialized hydraulic lifts to board wheelchairs, but have specially designated wheelchair areas to transport the handicapped. State law, at least in California, dictates certain parameters within which a wheelchair transport apparatus must fall, including the requirement of a minimum three-point tie-down and a maximum height of one and one-half inches above the floor surface for anchor points to which the tie-downs are connected.

Although this general area of interest is relatively newly developed and little prior art exists, at least two wheelchair restraining systems have been patented, one having U.S. Pat. No. 4,060,271 issued to Joseph J. Williams on Nov. 29, 1977, and the other having U.S. Pat. No. 4,093,303, issued to Eldrid W. Nelson, on June 6, 1978. Whereas both of these structures surely do the job, the Nelson patent describes an apparatus which extends from a vertical wall and the Williams patent, coming closest to the structure set forth by applicant herein, is undoubtedly engineering-wise adequate but makes no provision for the clutter-free storage of the wheelchair tie-down elements when they are not in use, and also involves the use of loose structure which must be attached to unstored chains which are lying loose on the floor of the bus.

There is a need for a wheelchair tie-down apparatus adapted for restraining a wheelchair to the floor of a bus, or the like, and which provides for automatic out-of-the-way containment of the tethering structure when not in use to minimize the possibility of the tie-down structure actually tripping an aide to the wheelchair victim, or otherwise becoming entangled in the wheelchair as it is moved onto and off of its station.

SUMMARY OF THE INVENTION

The present invention fulfills the above stated need and utilizes three elongated coffers defining a bay for each wheelchair, with each of the coffers having a hinged lid which opens to provide access to a flexible strap with a quick cinch-down mechanism so that the lid can be quickly opened, the flexible strap extended and engaged on the wheelchair, and then all three (or more) of the straps cinched down quickly to secure the wheelchair snugly in its bay.

When not in use, the straps can be laid inside the coffers with the hinged lids closed, and due to the ramp-like incline of the coffer walls, the coffers produce only slight traversable rises in the floor of the bus and confine the straps, hooks and other structure which would, absent the coffers, likely snag the wheelchair, trip the operator, or otherwise get in the way of the smooth functioning of the loading and unloading of the wheelchair victim aboard the bus.

DETAILED DESCRIPTION OF THE PREFERRED EMBODIMENT

Figure 3:
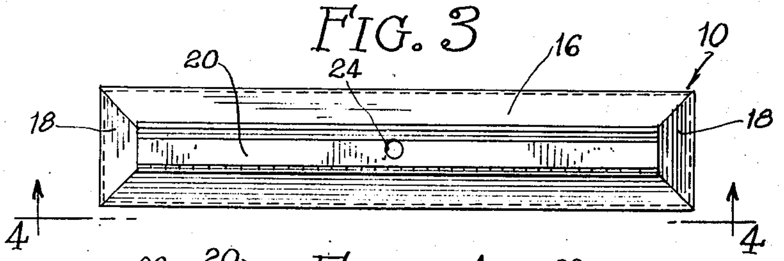
FIG. 3 is a top elevation view of a coffer with the lid closed.

The preferred embodiment of the instant invention contemplates the use of three coffers 10, each of which is elongated and appears from the top as does the coffer illustrated in FIG. 3. Each coffer comprises a bottom wall 12, which is flush against the vehicle floor 14, sloped sidewalls 16, similarly sloped end walls 18 and a lid 20 which is hinged at 22 and extends the substantial length of the coffer. A finger hole 24 is illustrated as being exemplary of some type of structure facilitating the manual opening of the lid 20.

Each of these coffers is firmly secured to the floor of the vehicle in some fashion, the technique shown being the utilization of eye bolts 26 which are shown as two in number per coffer, although they could be provided singly, or in quantities of more than two. These eye bolts have threaded shafts which extend through the floor 14 of the vehicle, capturing same between a pair of nuts 28 which maintain the eye portion 30 of the eye bolt spaced above the bottom wall 12 of the coffer. Thus, the eye bolts serve a double function, first that of anchoring the coffers 10 to the vehicle and second providing anchor members in the form of eyes 30 for the attachment of the flexible straps 32.

Figure 1:
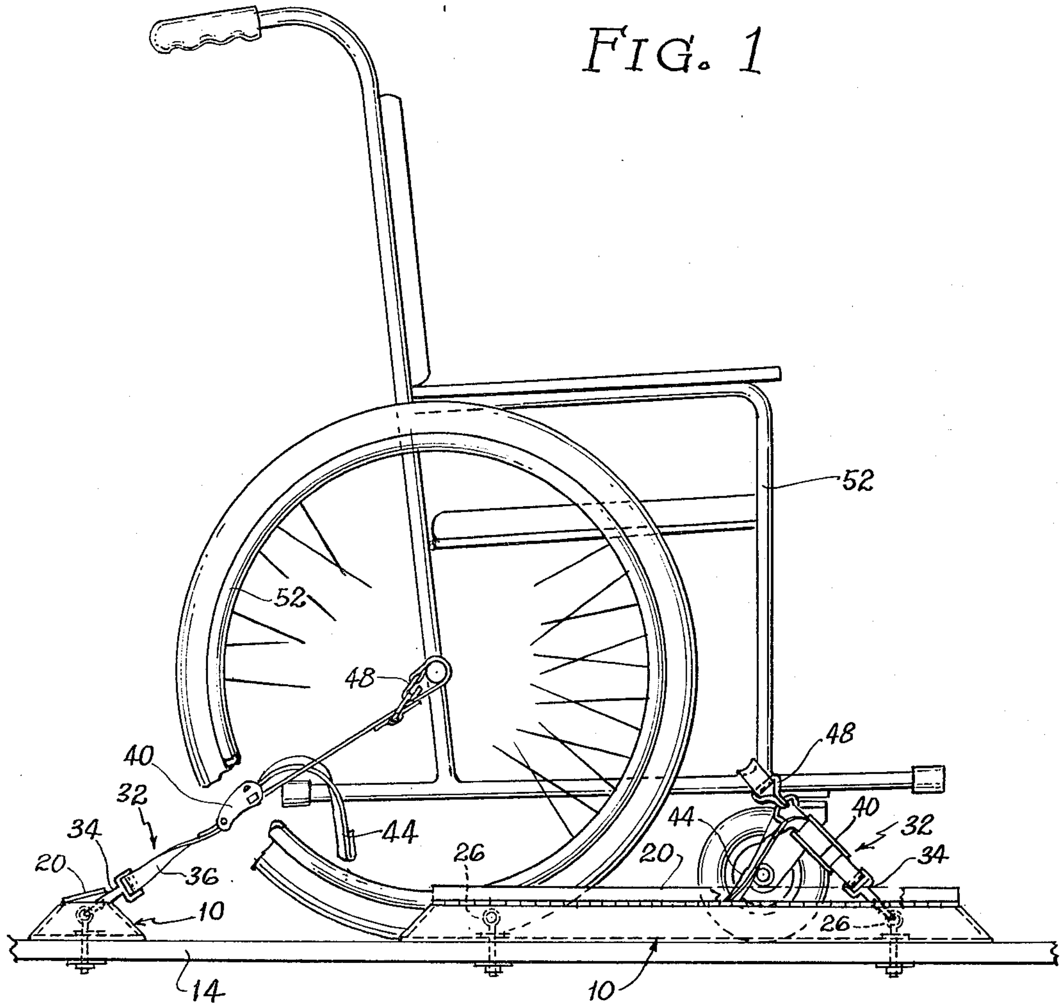
FIG. 1 is a diagrammatic side elevation view of a wheelchair showing it tied down in place aboard a vehicle.
Figure 2:
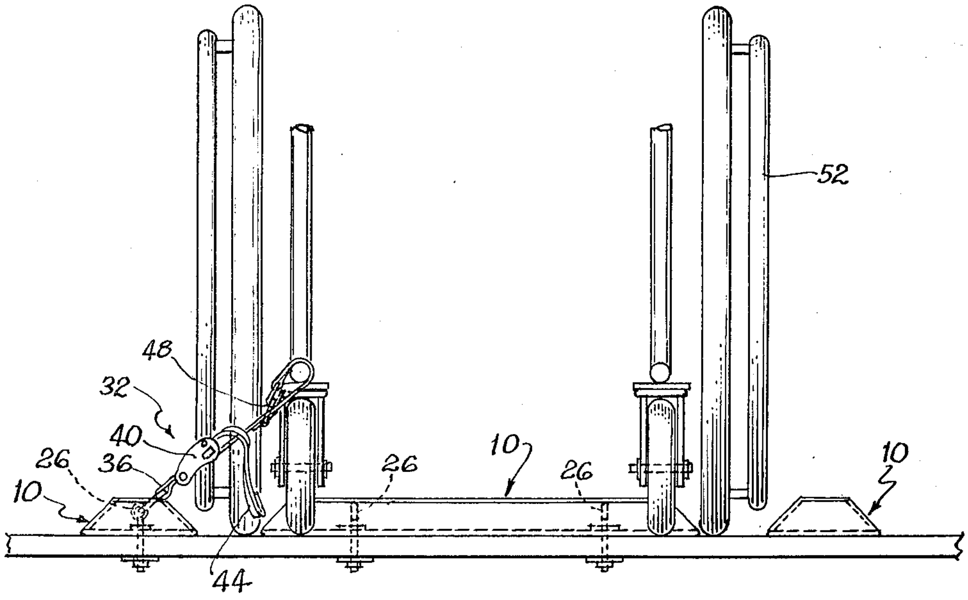
FIG. 2 is a diagrammatic front elevation view of the wheelchair shown in FIG. 1.
Figure 4:
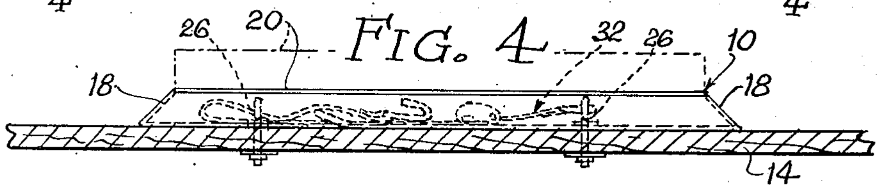
FIG. 4 is a sectional view taken along lines 4—4 of FIG. 3.
Figure 5:
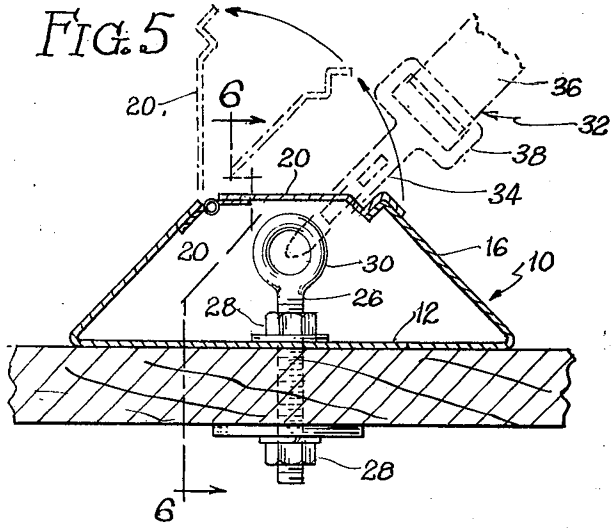
FIG. 5 is a transverse sectional view through a coffer showing the lid opened in phantom and the eye bolt connected to the tether strap.
Figure 6:
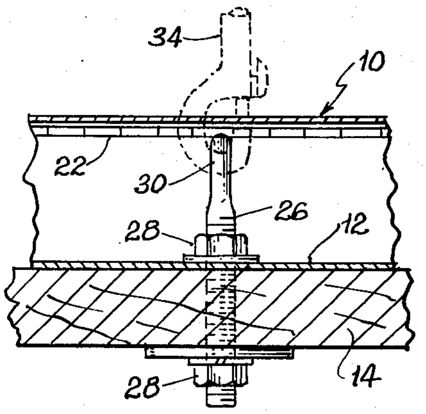
FIG. 6 is a sectional view taken along line 6—6 of FIG. 5 showing more detail of the eye bolt and tether connection.
Figure 7:
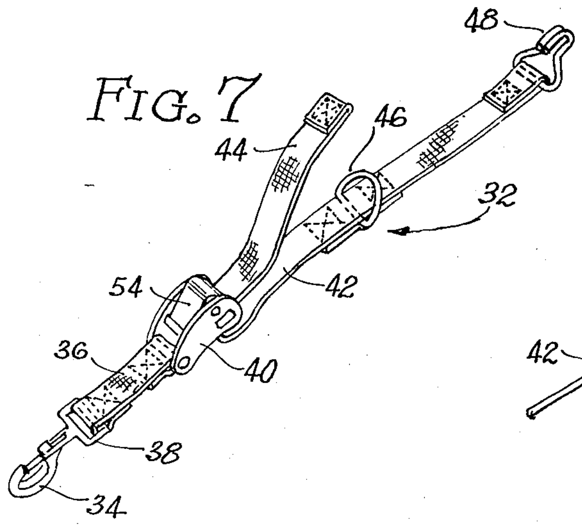
FIG. 7 is a perspective view of a typical strap mechanism.

As can be seen in FIGS. 1 and 2, the three coffers are deployed in a general U-shape defining a bay along the sides and rear of the wheelchair station. When there is no wheelchair in the station, the flexible straps 32 lie idle within the confines of the coffers as shown in FIG. 4. There could be one or more straps in each coffer, although ordinarily there would be no more straps than there were eye bolts 26 to mount them.

When the straps are deployed in active fashion to restrain a wheelchair, the lids 20 of the coffers are raised and the straps withdrawn except for the tethered ends which remain engaged in the eyes 30 by virtue of the releasable gate hooks 34. The gate hooks are connected to a short strap segment 36 which is stitched around the hook shackle 38 at one side and engages a seat belt connector 40 at the other side. The other end of the seat belt connector engages the main portion 42 of the strap 32 and provides a bitter end 44 which can be used to adjust the length of the strap and cinch down the wheelchair.

Figure 8:
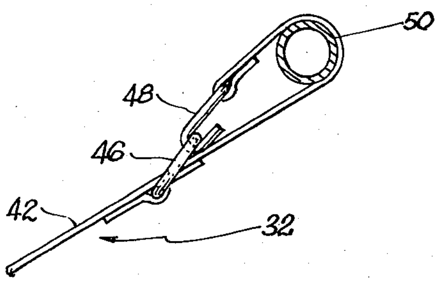
FIG. 8 is a sectional detail showing the strap of FIG. 7 engaged around a structural member of the wheelchair.

Toward the end of the strap segment 42 is an open link 46 securely stitched into integrity with the strap, and at the distal end of the flexible strap 32 is a hook 48 which can be entrained around any suitable structural member 50 of the wheelchair 52 as shown in FIG. 8, and hooked into the open link 46.

As mentioned above, there are at least three of the straps 32, one being housed in each of the coffers, and after each of the straps is secured to structural portions of the wheelchair as shown in FIG. 8, the ends 44 of the upper strap segments are pulled tightly with the hand to take up all the slack in the seat belt buckle 40. The combination of the hook and link wheelchair connector and the quick-cinching seat belt type buckle 40 enables a typical wheelchair to be secured in position in just a few seconds. To release the tension on the straps, the release bar 54 is lifted to instantaneously provide adequate slack to disconnect the hooks 48 from their respective links 46. The straps are then extended inside the coffers, and the hinged lids 20, which may be provided with return springs, are allowed to fall in place, and the wheelchair is then removed, free of all restraining structure, either connected to the wheelchair or lying around under foot.

The invention as shown and described herein is subject to certain modifications such as the altering of the exact shape and nature of the coffers 10 or the replacement of certain of the elements of the straps 32 with their mechanical equivalent, all of which would fall within the scope of the appended claims. The essence of the invention lies in the provision of completely self-contained, out of the way, flexible straps which are quickly and easily deployed and engaged on on the structural members of a wheelchair and then cinched down into the requisite secure mode for transport.

The invention claimed is:

1. In a vehicle having a floor and a designated floor area to provide a wheelchair station, a wheelchair tie-down apparatus comprising:

(a) a plurality of coffers mounted to said floor substantially in said designated area, each of said coffers having ramp-like walls and a hinged, substantially flat lid spanning the tops of said walls to permit a wheelchair to roll over said coffers with relative ease;

(b) an anchor member mounted in each coffer;

(c) a flexible strap for each of said anchor members, said straps each having a tethered end connected to an anchor member and a distal end having a wheelchair-engaging means thereon;

(d) each of said straps being dimensioned to lie within a respective one of said coffers when not in use and having a manually operable length adjustable means for cinching down said wheelchair when not in use.

2. The structure according to claim 1, wherein said coffers are three in number, two of which are disposed alongside said wheelchair station and the third being disposed at the rear of said wheelchair station to provide a three-point tie-down for said wheelchair.

3. The structure according to claim 2 wherein said coffers are elongated and define a U-shaped bay for said wheelchair.

* * * * *